US012286606B2

(12) United States Patent
Stewart et al.

(10) Patent No.: US 12,286,606 B2
(45) **Date of Patent: *Apr. 29, 2025**

(54) MULTI-PURPOSE CLEANING, DEGREASING, SANITIZING, AND DISINFECTING SOLUTIONS AND METHODS FOR PREPARING THE SAME

(71) Applicants: Patrick Stewart, Saugatuck, MI (US); Joshua Clemence, Covington, IN (US); Noah Durham, Champaign, IL (US); John P. Davis, Danville, IL (US)

(72) Inventors: Patrick Stewart, Saugatuck, MI (US); Joshua Clemence, Covington, IN (US); Noah Durham, Champaign, IL (US); John P. Davis, Danville, IL (US)

(73) Assignee: EnvirOx, LLC, Danville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,288

(22) Filed: Mar. 4, 2024

(65) Prior Publication Data

US 2024/0199995 A1 Jun. 20, 2024

Related U.S. Application Data

(63) Continuation of application No. 18/224,616, filed on Jul. 21, 2023, now abandoned, which is a continuation of application No. 18/075,789, filed on Dec. 6, 2022, now abandoned, which is a continuation of application No. 17/081,018, filed on Oct. 27, 2020, now Pat. No. 11,518,966.

(60) Provisional application No. 62/932,118, filed on Nov. 7, 2019.

(51) Int. Cl.

| | |
|---|---|
| ***C11D 1/12*** | (2006.01) |
| ***C11D 1/02*** | (2006.01) |
| ***C11D 1/04*** | (2006.01) |
| ***C11D 1/14*** | (2006.01) |
| ***C11D 1/20*** | (2006.01) |
| ***C11D 1/22*** | (2006.01) |
| ***C11D 1/37*** | (2006.01) |
| ***C11D 3/00*** | (2006.01) |
| ***C11D 3/20*** | (2006.01) |
| ***C11D 3/33*** | (2006.01) |
| ***C11D 3/39*** | (2006.01) |
| ***C11D 3/395*** | (2006.01) |
| ***C11D 3/43*** | (2006.01) |

(52) U.S. Cl.

CPC .............. *C11D 3/3945* (2013.01); *C11D 1/02* (2013.01); *C11D 1/04* (2013.01); *C11D 1/143* (2013.01); *C11D 1/20* (2013.01); *C11D 1/22* (2013.01); *C11D 1/37* (2013.01); *C11D 3/0047* (2013.01); *C11D 3/2068* (2013.01); *C11D 3/2082* (2013.01); *C11D 3/2086* (2013.01); *C11D 3/33* (2013.01); *C11D 3/3902* (2013.01); *C11D 3/3942* (2013.01); *C11D 3/3947* (2013.01); *C11D 3/43* (2013.01)

(58) Field of Classification Search

CPC .... C11D 1/20; C11D 1/22; C11D 1/02; C11D 3/2068; C11D 3/3902; C11D 3/2082; C11D 3/33

USPC ....... 510/238, 265, 366, 370, 372, 428, 434, 510/477

See application file for complete search history.

(56) References Cited

U.S. PATENT DOCUMENTS

| | | | |
|---|---|---|---|
| 4,414,128 | A | 11/1983 | Goffinet |
| 4,472,291 | A | 9/1984 | Rosano |
| 4,877,544 | A | 10/1989 | Gabriel et al. |
| 5,008,030 | A | 4/1991 | Cook et al. |
| 5,180,514 | A | 1/1993 | Farr et al. |
| 5,281,280 | A | 1/1994 | Lisowski et al. |
| 5,281,354 | A | 1/1994 | Faber |

(Continued)

FOREIGN PATENT DOCUMENTS

| | | | | |
|---|---|---|---|---|
| CA | 2712470 A1 * | 12/2009 | | C11D 1/94 |
| EP | 2808380 A1 * | 12/2014 | | C11D 1/66 |
| EP | 3053997 A1 * | 8/2016 | | C11D 3/225 |

*Primary Examiner* — Gregory R Delcotto

(74) *Attorney, Agent, or Firm* — King & Partners, PLC

(57) ABSTRACT

A cleaning solution including: a primary solvent; a secondary solvent, wherein the secondary solvent is at least partially miscible with the primary solvent; an oxidizing agent, wherein the oxidizing agent includes a peroxide; a chelating agent, wherein the chelating agent includes the structure of formula I:

(I)

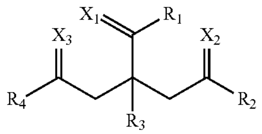

wherein $R_1$-$R_4$ are each independently selected from the group consisting of H; OH; and an alkyl, cycloalkyl, polycycloalkyl, heterocycloalkyl, aryl, alkaryl, aralkyl, alkoxy, alkanoyl, aroyl, alkenyl, alkyl-alkenyl, alcohol, ether, ketone, carboxylic acid, acid halide, acid anhydride, ester, and/or amide group containing approximately 1 to approximately 25 carbon atom(s); and wherein $X_1$-$X_3$ are each independently selected from the group consisting of O; S; and Se; a surfactant system, wherein the surfactant system includes a first anionic surfactant, a second anionic surfactant, a third anionic surfactant, and a fourth anionic surfactant; a pH modifier; and an optional amino acid.

3 Claims, No Drawings

(56) References Cited

U.S. PATENT DOCUMENTS

| | | | | |
|---|---|---|---|---|
| 5,531,938 | A | 7/1996 | Erilli | |
| 5,549,840 | A | 8/1996 | Mondin et al. | |
| 5,602,090 | A | 2/1997 | Melikyan et al. | |
| 5,653,970 | A | 8/1997 | Vermeer | |
| 6,703,357 | B1 * | 3/2004 | Maurer | C11D 3/38636 510/276 |
| 6,939,839 | B2 | 9/2005 | Johnson | |
| 7,439,218 | B2 | 10/2008 | Bowker | |
| 7,879,787 | B2 | 2/2011 | Heintz et al. | |
| 8,375,494 | B2 | 2/2013 | Hammock | |
| 10,119,099 | B2 | 11/2018 | Clemence et al. | |
| 11,518,966 | B2 | 12/2022 | Stewart et al. | |
| 2007/0281002 | A1 * | 12/2007 | Morales | A01N 33/12 424/443 |
| 2015/0252310 | A1 * | 9/2015 | Blattner | C11D 3/2068 510/366 |
| 2019/0330566 | A1 * | 10/2019 | Ceulemans | C11D 3/226 |

* cited by examiner

MULTI-PURPOSE CLEANING, DEGREASING, SANITIZING, AND DISINFECTING SOLUTIONS AND METHODS FOR PREPARING THE SAME

CROSS-REFERENCE TO RELATED APPLICATIONS

This application is a continuation of U.S. patent application Ser. No. 18/224,616, filed Jul. 21, 2023, entitled "PEROXIDE-BASED MULTI-PURPOSE CLEANING, DEGREASING, SANITIZING, AND DISINFECTING SOLUTIONS AND METHODS FOR PREPARING THE SAME," which is a continuation of U.S. patent application Ser. No. 18/075,789, filed Dec. 6, 2022, entitled "PEROXIDE-BASED MULTI-PURPOSE CLEANING, DEGREASING, SANITIZING, AND DISINFECTING SOLUTIONS AND METHODS FOR PREPARING THE SAME," which is a continuation of U.S. patent application Ser. No. 17/081,018, filed Oct. 27, 2020, entitled "PEROXIDE-BASED MULTI-PURPOSE CLEANING, DEGREASING, SANITIZING, AND DISINFECTING SOLUTIONS AND METHODS FOR PREPARING THE SAME," now U.S. Pat. No. 11,518,966, which claims the benefit of U.S. Provisional Application Ser. No. 62/932,118 entitled "PEROXIDE-BASED MULTI-PURPOSE CLEANING, DEGREASING, SANITIZING, AND DISINFECTING SOLUTIONS AND METHODS FOR PREPARING THE SAME," filed Nov. 7, 2019—all of which are hereby incorporated herein by reference in their entirety, including all references cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to multi-purpose cleaning, degreasing, sanitizing, and disinfecting solutions and, more particularly, to novel, peroxide-based cleaning solutions that are: (1) effective; (2) exhibit environmentally preferred characteristics for industrial, commercial, and residential applications; and (3) satisfy color, odor, and shelf life expectations of the customer. The novel peroxide-based cleaning solutions of the present invention are preferably suitable for use as a deodorizer, a virucide and/or a disinfectant for hard, non-porous surfaces, among other surfaces. The novel peroxide-based cleaning solutions of the present invention are also preferably suitable for carpet extraction applications, namely for cleaning, deodorizing, killing odor causing bacteria, and/or sanitizing.

2. Background Art

Cleaning solutions and associated formulations have been known in the art for years and are the subject of a plurality of patents and/or publications, including: U.S. Pat. No. 8,375,494 entitled "Cleaning Compositions Containing A Corrosion Inhibitor," U.S. Pat. No. 7,879,787 entitled "Cleaning Compositions For Hard To Remove Organic Material," U.S. Pat. No. 7,439,218 entitled "Disinfectant Compositions Comprising An Orange Oil Mixture And Methods Of Use Thereof," U.S. Pat. No. 6,939,839 entitled "Cleaning Composition With Terpene And Hydrogen Peroxide," U.S. Pat. No. 5,653,970 entitled "Personal Product Compositions Comprising Heteroatom Containing Alkyl Aldonamide Compounds," U.S. Pat. No. 5,602,090 entitled "Surfactant Based Aqueous Compositions With D-Limonene And Hydrogen Peroxide And Methods Using The Same," U.S. Pat. No. 5,549,840 entitled "Cleaning Composition In Microemulsion, Liquid Crystal Or Aqueous Solution Form Comprising Mixture Of Partially Esterified, Full Esterified And Non-Esterified Ethoxylated Polyhydric Alcohols," U.S. Pat. No. 5,281,354 entitled "Liquid Cleanser Composition," U.S. Pat. No. 4,877,544 entitled "Oxidation Stable Surfactants," and U.S. Pat. No. 4,472,291 entitled "High Viscosity Microemulsions" all of which are hereby incorporated herein by reference in their entirety—including all references cited therein.

U.S. Pat. No. 8,375,494 appears to disclose cleaning compositions containing a corrosion inhibitor for removing soil from carpets, upholstery and the like without subjecting common metal alloys used in aircraft and other constructions to corrosive attack. The cleaning compositions include at least one dispersing agent, at least one anti-redeposition agent, at least one corrosion inhibitor, at least one pH modifier, at least one chelating agent and at least one stabilizing agent. The compositions also optionally include at least one fragrance and/or at least one preservative agent.

U.S. Pat. No. 7,879,787 appears to disclose an oxidizing cleaning composition that comprises a low concentration of aqueous hydrogen peroxide that is environmentally friendly and has stability in strong alkaline solutions. The aqueous hydrogen peroxide composition contains a combination of one or more hydrophilic surfactants having an HLB of 10 or greater, one or more hydrotropes, one or more UV-analyzable surfactants having an aromatic detectable functional group, and optionally a surfactant having an HLB of less than 10. The cleaning composition when mixed with an alkaline compound purports to be very effective in removing dried or baked residues of polymers, modified or natural celluloses starches, natural gels, and the like at low concentrations and temperatures.

U.S. Pat. No. 7,439,218 appears to disclose a disinfectant composition comprising hydrogen peroxide ($H_2O_2$), orange terpene oil, orange valencia oil, a non-ionic emulsifier, and distilled or deionized water ($H_2O$).

U.S. Pat. No. 6,939,839 appears to disclose a cleaning composition that uses a terpene such as D-limonene or orange oil, a nonionic surfactant, a single anionic surfactant, an anti-oxidant, hydrogen peroxide, and the balance deionized water.

U.S. Pat. No. 5,653,970 appears to disclose personal product compositions having heteroatom containing alkyl aldonamide compounds and a skin-conditioning agent. The '970 patent teaches that when these heteroatom containing alkyl aldonamides are used, benefits such as enhanced stability and/or enhanced viscosity are obtained relative to the use of other known thickeners or non-heteroatom containing aldonamides.

U.S. Pat. No. 5,602,090 appears to disclose a cleaning composition including a terpene such as D-limonene and hydrogen peroxide in a surfactant based aqueous solution. The composition in various specific formulations is a microemulsion useful for a variety of materials for both industrial and household applications.

U.S. Pat. No. 5,549,840 appears to disclose liquid crystal compositions or microemulsion compositions that are effective in the removal of oily and greasy soil and have evidenced grease release effect. Such compositions contain an anionic detergent, an ethoxylated glycerol type compound, a hydrocarbon ingredient, and water which comprises the use of a water-insoluble odoriferous perfume as the essential hydrocarbon ingredient in a proportion sufficient to form a dilute o/w microemulsion composition.

U.S. Pat. No. 5,281,354 appears to disclose a liquid cleanser composition, particularly for use as a hard surface cleanser that comprises a mixture of from about 0.5% to about 10% of a terpene selected from mono- and sesquiterpenes and mixtures thereof, from about 1% to about 10% of a water miscible solvent, and, from about 1% to about 10% of an amide surfactant. The '354 patent also discloses that the composition can contain from about 10% to about 70% of a water-insoluble abrasive.

U.S. Pat. No. 4,877,544 appears to disclose detergent compositions comprising a special type of oxidation resistant nonionic surfactant and an oxidizing agent which may either be a hypochlorite or a peroxygen material. The surfactant component structurally comprises a $C_8$-$C_{12}$ alkyl substituted phenoxy hydrophobe alkoxylated with ethylene oxide and/or propylene oxide, with the proviso that the ratio of ethylene oxide to propylene oxide is at least 1 but no higher than 10. Methyl or chloroethyl groups are used to endcap the surfactant.

U.S. Pat. No. 4,472,291 appears to disclose an oil-in-water microemulsion of increased viscosity. The microemulsion comprises an aqueous continuous phase, an oil phase, a primary surfactant having a lipophilic moiety and a hydrophilic moiety, wherein the hydrophilic moiety carries an electrostatic charge and a cosurfactant. The viscosity is increased by adding a secondary surfactant which is characterized by a long chain lipophilic moiety and a charged hydrophilic moiety which is reactive with the charged hydrophilic moiety of the primary surfactant. In forming the microemulsion of increased viscosity, the microemulsion is formed first in the absence of the secondary surfactant, and the secondary surfactant is added thereto.

While the cleaning solutions and formulations disclosed supra have been known in the art for years, issues associated with formulation performance, color, odor, and extended shelf life while maintaining environmentally preferred characteristics remain largely problematic and/or unsolved. As such, there is a genuine demand for novel peroxide-based cleaning, degreasing, sanitizing, and/or disinfecting solutions that are effective, exhibit environmentally preferred characteristics for industrial, commercial, and residential applications, and satisfy performance, color, odor, and shelf life expectations of the customer.

These and other objects of the present invention will become apparent in light of the present specification, claims, chemical structures, chemical formulae, and drawings.

SUMMARY OF THE INVENTION

The present invention is directed to a cleaning solution comprising, consisting essentially of, and/or consisting of: (1) a primary solvent; (2) a secondary solvent, wherein the secondary solvent is at least partially miscible with the primary solvent; (3) an oxidizing agent, wherein the oxidizing agent comprises a peroxide; (4) a chelating agent, wherein the chelating agent comprises the structure of formula I:

(I)

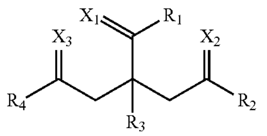

wherein $R_1$-$R_4$ are each independently selected from the group consisting of H; OH; and an alkyl, cycloalkyl, polycycloalkyl, heterocycloalkyl, aryl, alkaryl, aralkyl, alkoxy, alkanoyl, aroyl, alkenyl, alkyl-alkenyl, alcohol, ether, ketone, carboxylic acid, acid halide, acid anhydride, ester, and/or amide group containing approximately 1 to approximately 25 carbon atom(s); and wherein $X_1$-$X_3$ are each independently selected from the group consisting of O; S; and Se; (5) a surfactant system, wherein the surfactant system comprises a first anionic surfactant, a second anionic surfactant, a third anionic surfactant, and a fourth anionic surfactant; and (6) a pH modifier, wherein the pH modifier comprises phosphoric acid.

In a preferred embodiment of the present invention, the primary solvent comprises water.

In another preferred embodiment of the present invention, the secondary solvent comprises a water soluble, hydrophilic solvent that exhibits coupling characteristics and a moderate evaporation rate. In this embodiment, the secondary solvent preferably comprises dipropylene glycol methyl ether.

In yet another preferred embodiment of the present invention, the oxidizing agent is a peroxide selected from the group consisting of an inorganic peroxide and an organic peroxide. In this embodiment, the oxidizing agent preferably comprises hydrogen peroxide.

In a preferred embodiment of the present invention, $R_1$-$R_4$ of the chelating agent each comprise OH.

In another preferred embodiment of the present invention, the chelating agent comprises the structure of formula II:

(II)

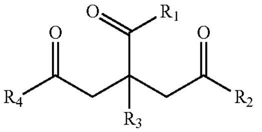

wherein $R_1$-$R_4$ are each independently selected from the group consisting of H; OH; and an alkyl, cycloalkyl, polycycloalkyl, heterocycloalkyl, aryl, alkaryl, aralkyl, alkoxy, alkanoyl, aroyl, alkenyl, alkyl-alkenyl, alcohol, ether, ketone, carboxylic acid, acid halide, acid anhydride, ester, and/or amide group containing approximately 1 to approximately 25 carbon atom(s).

In yet another preferred embodiment of the present invention, the chelating agent comprises the structure of formula III (citric acid):

(III)

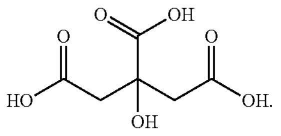

In a preferred embodiment of the present invention, the first anionic surfactant comprises a sarcosinate. In this embodiment, the sarcosinate preferably comprises the structure of formula IV (sodium lauroyl sarcosinate):

(IV)

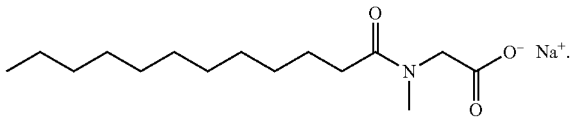

In another preferred embodiment of the present invention, the second anionic surfactant comprises a laurate. In this embodiment, the laurate preferably comprises the structure of formula V (sodium laurate):

(V)

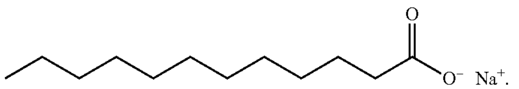

In one preferred embodiment of the present invention, the third anionic surfactant preferably comprises a sulfonate.

In a preferred embodiment of the present invention, the third anionic surfactant preferably comprises an alkyl benzene sulfonate.

In another preferred embodiment of the present invention, the third anionic surfactant comprises the structure of formula VI:

(VI)

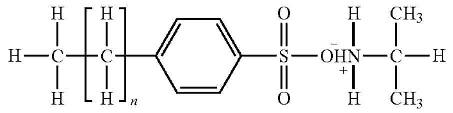

wherein n comprises an integer ranging from approximately 5 to approximately 15.

In yet another preferred embodiment of the present invention, the third anionic surfactant comprises the structure of formula VII:

(VII)

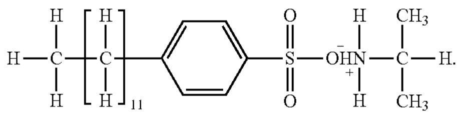

In a preferred embodiment of the present invention, the fourth anionic surfactant comprises a xylenesulphonate. In this embodiment, the fourth anionic surfactant preferably comprises the structure of formula VIII (sodium xylenesulphonate):

(VIII)

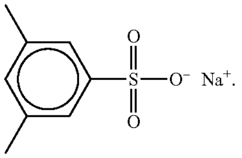

The present invention is also directed to a cleaning solution comprising, consisting essentially of, and/or consisting of: (1) a primary solvent; (2) a secondary solvent, wherein the secondary solvent is at least partially miscible with the primary solvent; (3) an oxidizing agent, wherein the oxidizing agent comprises a peroxide; (4) a chelating agent, wherein the chelating agent comprises the structure of formula I:

(I)

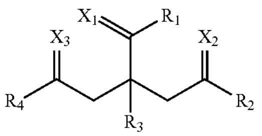

wherein $R_1$-$R_4$ are each independently selected from the group consisting of H; OH; and an alkyl, cycloalkyl, polycycloalkyl, heterocycloalkyl, aryl, alkaryl, aralkyl, alkoxy, alkanoyl, aroyl, alkenyl, alkyl-alkenyl, alcohol, ether, ketone, carboxylic acid, acid halide, acid anhydride, ester, and/or amide group containing approximately 1 to approximately 25 carbon atom(s); and wherein $X_1$-$X_3$ are each independently selected from the group consisting of O; S; and Se; (5) a surfactant system, wherein the surfactant system comprises a first anionic surfactant, a second anionic surfactant, a third anionic surfactant, and a fourth anionic surfactant; (6) a pH modifier, wherein the pH modifier comprises phosphoric acid; and (7) an amino acid. In this embodiment, the amino acid preferably comprises L-cystine.

The present invention is further directed to a cleaning solution comprising, consisting essentially of, and/or consisting of: (1) from approximately 75% to approximately 98% by weight a primary solvent, wherein the primary solvent is water; (2) from approximately 0.1% to approximately 5.0% a secondary solvent, wherein the secondary solvent is dipropylene glycol methyl ether; (3) from approximately 0.5% to approximately 2.0% an oxidizing agent, wherein the oxidizing agent is hydrogen peroxide; (4) from approximately 0.01% to approximately 1.00% a chelating agent, wherein the chelating agent is citric acid; (5) from approximately 0.5% to approximately 2.0% a homogenous surfactant system, wherein the homogenous surfactant system comprises a first anionic surfactant, a second anionic surfactant, a third anionic surfactant, and a fourth anionic surfactant, and wherein the first anionic surfactant is sodium lauroyl sarcosinate, the second anionic surfactant is sodium laurate, the third anionic surfactant is sodium ($C_{10-16}$) benzenesulfonate, and the fourth anionic surfactant is sodium xylenesulphonate; and (6) from approximately 0.05% to approximately 1.00% a pH modifier, wherein the pH modifier is phosphoric acid; and (7) wherein any remainder comprises one or more adjunct agents.

DETAILED DESCRIPTION OF THE INVENTION

While this invention is susceptible of embodiment in many different forms, there is shown in the structural formulas and described herein in detail several specific embodiments with the understanding that the present disclosure is to be considered as an exemplification of the principles of the invention and is not intended to limit the invention to the embodiments illustrated. It will be understood that the structural formulas disclosed herein are intended to comprise all stereochemical configurations regardless of graphical representations.

In accordance with the present invention, peroxide-based cleaning, degreasing, sanitizing, and/or disinfecting solutions are disclosed herein that are effective, exhibit environmentally preferred characteristics for industrial, commercial, and/or residential applications, and satisfy color, odor, and/or shelf life expectations of the customer.

In one embodiment of the present invention, the cleaning solution comprises: a primary solvent, a secondary solvent, an oxidizing agent, a chelating agent, a surfactant system, a pH modifier, and optionally one or more amino acids.

For purposes of the present disclosure, the primary solvent of the solution may comprise one or more of any one of a number of common, commercially available solvents, including polar solvents and/or non-polar solvents. Specific examples of preferred solvents include, for example, water, deionized, distilled, and/or reverse osmosis water, hexane, acetone, methyl ethyl ketone, toluene, benzene, ethers, 3-methylsulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same. While specific solvents have been disclosed, for illustrative purposes only, as being suitable primary solvents, numerous other solvents that would be known to those having ordinary skill in the art having the present disclosure before them are likewise contemplated for use. Indeed, it will be understood that non-liquid or polymer type media are suitable for use in accordance with the present invention. Preferably, the primary solvent is present in a concentration ranging from approximately 60 percent by weight to approximately 98 percent by weight, and more preferably from approximately 75 percent by weight to approximately 98 percent by weight.

In accordance with the present invention, the cleaning solution includes a secondary solvent that is preferably clear, colorless, biocompatible, and at least partially miscible in water. The secondary solvent is also preferably a water soluble, hydrophilic solvent that exhibits a moderate evaporation rate (e.g., minutes—as compared to seconds (fast) or hours (long)) and coupling characteristics. Suitable examples of secondary solvents include dipropylene glycol methyl ether and/or 3-methoxy-3-methyl-1-butanol, and derivatives thereof (commercially available from Sigma-Aldrich). Preferably, the secondary solvent is present in a concentration ranging from approximately 0.01 percent by weight to approximately 10.00 percent by weight, and more preferably from approximately 0.1 percent by weight to approximately 5.0 percent by weight.

In one embodiment of the present invention, the oxidizing agent comprises a peroxide, such an inorganic peroxide (e.g., hydrogen peroxide, 35% aqueous hydrogen peroxide commercially available from Sigma-Aldrich) and/or an organic peroxide. Other examples of oxidizing agents include electron accepting compounds, nitric acid, sulfuric acid, hydrochloric acid, peroxydisulfuric acid, hydrochloric acid, and peroxymonosulfuric acid. Preferably, the oxidizing agent is present in a concentration ranging from approximately 0.5 percent by weight to approximately 25.0 percent by weight, and more preferably from approximately 0.5 percent by weight to approximately 2.0 percent by weight.

For purposes of the present disclosure, the chelating agent preferably comprises citric acid (commercially available from Sigma-Aldrich) and derivatives thereof and/or the structure of formula I:

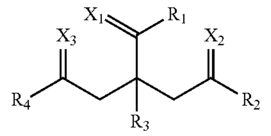

(I)

wherein $R_1$-$R_4$ are each independently selected from the group consisting of H; OH; and an alkyl, cycloalkyl, polycycloalkyl, heterocycloalkyl, aryl, alkaryl, aralkyl, alkoxy, alkanoyl, aroyl, alkenyl, alkyl-alkenyl, alcohol, ether, ketone, carboxylic acid, acid halide, acid anhydride, ester, and/or amide group containing approximately 1 to approximately 25 carbon atom(s); and wherein $X_1$-$X_3$ are each independently selected from the group consisting of O; S; and Se.

In a preferred embodiment of the present invention, the chelating agent comprises the structure of formula II:

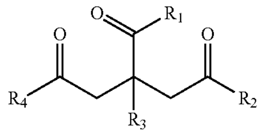

(II)

wherein $R_1$-$R_4$ are each independently selected from the group consisting of H; OH; and an alkyl, cycloalkyl, polycycloalkyl, heterocycloalkyl, aryl, alkaryl, aralkyl, alkoxy, alkanoyl, aroyl, alkenyl, alkyl-alkenyl, alcohol, ether, ketone, carboxylic acid, acid halide, acid anhydride, ester, and/or amide group containing approximately 1 to approximately 25 carbon atom(s). One specific example of a suitable chelating agent comprises the structure of formula III:

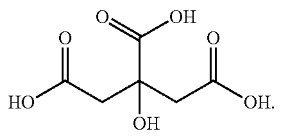

(III)

Preferably, the chelating agent is present in a concentration ranging from approximately 0.001 percent by weight to approximately 5.00 percent by weight, and more preferably from approximately 0.01 percent by weight to approximately 1.00 percent by weight. It will be understood that the chelating agent may also serve as a pH modifier. It will be further understood that additional and/or other weak and/or strong acids are likewise contemplated for use in accordance with the present invention—so long as the formulation is suitable for intended surfaces.

For purposes of the present disclosure the cleaning solution comprises a surfactant system (e.g., a homogenous surfactant system) that preferably comprises: (1) a first anionic surfactant, (2) a second anionic surfactant, (3) a third anionic surfactant, and (4) a fourth anionic surfactant.

Preferably, the first anionic surfactant includes a sarcosinate, such as, but not limited to, the sarcosinate represented by the structure of formula IV:

(IV)

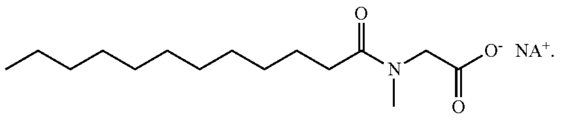

Preferred examples of anionic surfactants include sarcosinates commercially available from Sigma-Aldrich and/or Stepan. Preferably, the first anionic surfactant is present in a concentration ranging from approximately 0.1 percent by weight to approximately 5.0 percent by weight, and more preferably from approximately 0.5 percent by weight to approximately 2.0 percent by weight.

Preferably, the second anionic surfactant includes a laurate, such as, but not limited to, the laurate represented by the structure of formula V (sodium laurate):

(V)

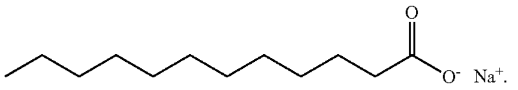

Preferred examples of anionic surfactants include laurates commercially available from Sigma-Aldrich and/or Stepan. Preferably, the second anionic surfactant is present in a concentration ranging from approximately 0.1 percent by weight to approximately 5.0 percent by weight, and more preferably from approximately 0.5 percent by weight to approximately 2.0 percent by weight.

In a preferred embodiment of the present invention, the third anionic surfactant comprises sulfonates, including, but not limited to, alkyl benzene sulfonates commercially available from Stepan (e.g., sodium ($C_{10-16}$) benzenesulfonate). Other suitable third anionic surfactants comprise the structure of formula VI:

(VI)

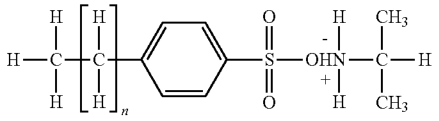

wherein n comprises an integer ranging from approximately 5 to approximately 15. One specific example of a third anionic surfactant comprises the structure of formula VII:

(VII)

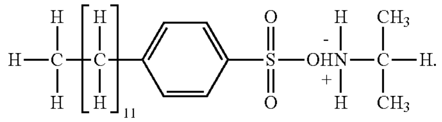

Preferably, the third anionic surfactant is present in a concentration ranging from approximately 0.1 percent by weight to approximately 5.0 percent by weight, and more preferably from approximately 0.5 percent by weight to approximately 2.0 percent by weight.

Preferably, the fourth anionic surfactant includes a sulphonate and/or a xylenesulphonate, such as, but not limited to, the xylenesulphonate represented by the structure of formula VIII (sodium xylenesulphonate):

(VIII)

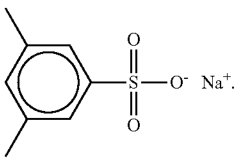

Preferred examples of anionic surfactants include sulphonates commercially available from Sigma-Aldrich and/or Stepan. Preferably, the fourth anionic surfactant is present in a concentration ranging from approximately 0.1 percent by weight to approximately 5.0 percent by weight, and more preferably from approximately 0.5 percent by weight to approximately 2.0 percent by weight.

For purposes of the present disclosure the cleaning solution preferably comprises a pH modifier, such as, but not limited to, weak acids, strong acids (e.g., phosphoric acid), weak bases, strong bases, and/or buffering combinations of the same. Preferably, the pH modifier is present in a concentration ranging from approximately 0.05 percent by weight to approximately 5.00 percent by weight, and more preferably from approximately 0.05 percent by weight to approximately 1.00 percent by weight.

In a preferred embodiment of the present invention, the cleaning solution preferably comprises an optional amino acid, such as, L-cystine. Preferably, the amino acid is present in a concentration ranging from approximately 0.001 percent by weight to approximately 5.000 percent by weight, and more preferably from approximately 0.01 percent by weight to approximately 2.00 percent by weight.

In one preferred embodiment of the present invention, the cleaning solutions/formulations may comprise one or more adjunct agents including, but not limited to, herbal additives, anti-oxidants, buffers, scents, fragrances, colorants, and/or stabilizers.

In one aspect of the present invention, the weight ratio of the oxidizing agent to the surfactant system to the chelating agent preferably ranges from approximately (i.e., +/−10 percent) 75:25:1 to approximately 65:15:1 (i.e., +/−10 percent). It will be understood that other weight ratios and ranges are obtainable from Examples 1-4.

Provided below are non-limiting examples of cleaning solution formulations in accordance with the present invention.

Example 1

| Ingredient Name | Phase | Amount (% by Wt.) |
|---|---|---|
| Water | A | 75.00-98.00 |
| Sodium lauroyl sarcosinate | A | 0.10-2.00 |
| Sodium laurate | A | 0.02-0.80 |
| Sodium (C10-16) benzenesulfonate | A | 0.10-2.00 |
| Sodium xylenesulphonate | A | 0.01-0.80 |
| Dipropylene glycol methyl ether | A | 0.05-1.00 |
| Hydrogen peroxide | A | 0.50-1.50 |
| Citric acid | A | 0.01-2.00 |
| Phorphoric Acid | A | 0.05-2.00 |

Appearance = clear, colorless, pH 2-3

Example 2

| Ingredient Name | Phase | Amount (% by Wt.) |
|---|---|---|
| Water | A | 75.00-98.00 |
| Sodium lauroyl sarcosinate | A | 0.10-2.00 |
| Sodium (C10-16) benzenesulfonate | A | 0.10-2.00 |
| Dipropylene glycol methyl ether | A | 0.05-1.00 |
| Hydrogen peroxide | A | 0.50-1.50 |
| Citric acid | A | 0.01-2.00 |
| Phorphoric Acid | A | 0.05-2.00 |

Appearance = clear, colorless, pH 2-3

Example 3

| Ingredient Name | Phase | Amount (% by Wt.) |
|---|---|---|
| Water | A | 75.00-98.00 |
| Sodium lauroyl sarcosinate | A | 0.10-2.00 |
| Sodium laurate | A | 0.02-0.80 |
| Sodium (C10-16) benzenesulfonate | A | 0.10-2.00 |
| Sodium xylenesulphonate | A | 0.01-0.80 |
| Dipropylene glycol methyl ether | A | 0.05-1.00 |
| Hydrogen peroxide | A | 0.50-1.50 |
| Citric acid | A | 0.01-2.00 |
| Phorphoric Acid | A | 0.05-2.00 |
| L-cystine | A | 0.005-0.050 |

Appearance = clear, colorless, pH 2-3

Example 4

| Ingredient Name | Phase | Amount (% by Wt.) |
|---|---|---|
| Water | A | 75.00-98.00 |
| Sodium lauroyl sarcosinate | A | 0.10-2.00 |
| Sodium (C10-16) benzenesulfonate | A | 0.10-2.00 |
| 3-methoxy-3-methyl-1-butanol | A | 0.05-1.00 |
| Hydrogen peroxide | A | 0.50-1.50 |
| Citric acid | A | 0.01-2.00 |
| Phorphoric Acid | A | 0.05-2.00 |
| L-cystine | A | 0.005-0.050 |

Appearance = clear, colorless, pH 2-3

Procedure:

1. PHASE A in main vessel, add Phase A ingredients one at a time and mix until completely dissolved and uniform.

It will be further understood that any reference to compounds disclosed herein includes salts and/or solvates of the same.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A cleaning solution, consisting of:

75.00-98.00% by weight water;

0.10-2.00% by weight sodium lauroyl sarcosinate;

0.02-0.80% by weight sodium laurate;

0.10-2.00% by weight sodium (C10-16) benzene-sulfonate;

0.01-0.80% by weight sodium xylenesulphonate;

0.05-1.00% by weight dipropylene glycol methyl ether;

0.50-1.50% by weight hydrogen peroxide;

0.01-2.00% by weight citric acid;

0.05-2.00% by weight phosphoric acid; and 0.005-0.050% by weight L-cystine.

2. A cleaning solution, consisting of:

75.00-98.00% by weight water;

0.10-2.00% by weight sodium lauroyl sarcosinate;

0.02-0.80% by weight sodium laurate;

0.10-2.00% by weight sodium (C10-16) benzene-sulfonate;

0.01-0.80% by weight sodium xylenesulphonate;

0.05-1.00% by weight dipropylene glycol methyl ether;

0.50-1.50% by weight hydrogen peroxide;

0.01-2.00% by weight citric acid;

0.05-2.00% by weight phosphoric acid;

0.005-0.050% by weight L-cystine; and wherein the solution has a pH of 2-3.

3. A cleaning solution, consisting of:

75.00-98.00% by weight water;

0.10-2.00% by weight sodium lauroyl sarcosinate;

0.02-0.80% by weight sodium laurate;

0.10-2.00% by weight sodium (C10-16) benzene-sulfonate;

0.01-0.80% by weight sodium xylenesulphonate;

0.05-1.00% by weight dipropylene glycol methyl ether;

0.50-1.50% by weight hydrogen peroxide;

0.01-2.00% by weight citric acid;

0.05-2.00% by weight phosphoric acid;

0.005-0.050% by weight L-cystine; and wherein the solution has a pH of 2-3 and is clear and colorless.

* * * * *